(12) United States Patent
Thomasset et al.

(10) Patent No.: US 11,124,342 B2
(45) Date of Patent: Sep. 21, 2021

(54) BUTT-WELDED TUBULAR PACKAGING BODY

(71) Applicant: AISAPACK HOLDING S.A., Vouvry (CH)

(72) Inventors: Jacques Thomasset, Vouvry (CH); Gerhard Keller, Vouvry (CH)

(73) Assignee: AISAPACK HOLDING S.A., Vouvry (CH)

( * ) Notice: Subject to any disclaimer, the term of this patent is extended or adjusted under 35 U.S.C. 154(b) by 517 days.

(21) Appl. No.: 14/407,075

(22) PCT Filed: Jun. 12, 2013

(86) PCT No.: PCT/IB2013/054816
§ 371 (c)(1),
(2) Date: Dec. 11, 2014

(87) PCT Pub. No.: WO2013/186723
PCT Pub. Date: Dec. 19, 2013

(65) Prior Publication Data
US 2015/0132517 A1  May 14, 2015

(30) Foreign Application Priority Data
Jun. 15, 2012 (EP) .................................. 12172306.8

(51) Int. Cl.
*B65D 75/06* (2006.01)
*B29C 65/00* (2006.01)
(Continued)

(52) U.S. Cl.
CPC .......... *B65D 75/06* (2013.01); *B29C 65/5042* (2013.01); *B29C 65/5071* (2013.01);
(Continued)

(58) Field of Classification Search
CPC ..... B29C 53/382; B29C 53/50; B29C 65/368; B65D 35/02; B65D 75/06; Y10T 428/1359
(Continued)

(56) References Cited

U.S. PATENT DOCUMENTS 2,430,046 A   11/1947   Dreyfus et al.
4,399,839 A   8/1983   Hutschenreuter et al.
(Continued)

FOREIGN PATENT DOCUMENTS

DE   17 29 018   6/1971
EP   0 177 470   4/1986
(Continued)

OTHER PUBLICATIONS

International Search Report for PCT/IB2013/054816, dated Dec. 13, 2013.
(Continued)

*Primary Examiner* — Ellen S Hock
(74) *Attorney, Agent, or Firm* — Nixon & Vanderhye P.C.

(57) ABSTRACT

The present invention relates to a tubular packaging body formed from a flexible film having a thickness e, the ends of which are butt welded and covered by a plastic reinforcement element located on the inner surface of said tubular body and having a section defined by a width l and a height h, said tubular body being characterized in that all of the following conditions should be met: —h is greater than or equal to e, —the ratio $(l \cdot e)/h^2$ is between 1 and 10.

17 Claims, 3 Drawing Sheets

(51) Int. Cl.
  *B65D 35/02* (2006.01)
  *B29C 65/50* (2006.01)
  *B29C 65/48* (2006.01)

(52) U.S. Cl.
  CPC ...... *B29C 66/1142* (2013.01); *B29C 66/4322* (2013.01); *B29C 66/723* (2013.01); *B65D 35/02* (2013.01); *B29C 65/4815* (2013.01); *B29C 66/71* (2013.01); *B29C 66/7234* (2013.01); *B29C 66/72321* (2013.01); *B29C 66/73713* (2013.01); *Y10T 428/139* (2015.01)

(58) Field of Classification Search
  USPC .................. 428/34.7, 35.1, 35.8; 222/107
  See application file for complete search history.

(56) References Cited

U.S. PATENT DOCUMENTS

| | | | |
|---|---|---|---|
| 4,401,136 | A | 8/1983 | Porrmann et al. |
| 4,733,800 | A | 3/1988 | Bjorkengren et al. |
| 5,197,935 | A | 3/1993 | Schweri |
| 5,725,958 | A * | 3/1998 | Matsuda ............. B32B 15/08 428/446 |
| 7,038,766 | B2 | 5/2006 | Kerns et al. |
| 2009/0176044 | A1 | 7/2009 | Thomasset et al. |
| 2009/0286025 | A1 | 11/2009 | Thomasset |
| 2010/0000674 | A1 * | 1/2010 | Voigtmann ............. B29C 53/50 156/280 |

FOREIGN PATENT DOCUMENTS

| | | |
|---|---|---|
| EP | 2 511 089 A1 | 10/2012 |
| JP | H06166107 A | 6/1994 |
| JP | 8-324600 | 12/1996 |
| JP | 8-324600 A | 12/1996 |
| JP | 10-120990 A | 5/1998 |
| JP | 2001-206458 A | 7/2001 |
| JP | 2002-145242 A | 5/2002 |
| JP | 3484542 B2 | 1/2004 |
| KR | 2008-0111478 A | 12/2008 |
| KR | 2011-0028308 A | 3/2011 |
| WO | WO2006135315 * | 12/2006 |
| WO | 2007/113782 A2 | 10/2007 |
| WO | WO 2007/113781 | 10/2007 |
| WO | 2008/038206 A2 | 4/2008 |

OTHER PUBLICATIONS

Non-English Written Opinion of the ISA for PCT/IB2013/054816, dated Dec. 13, 2013.
First Office Action issued in Chinese Patent Application No. 2013-800310497 and English translation.
The Second Office Action dated Jul. 18, 2016, issued in Chinese Patent Application No. 2013800310497 and English translation.
Decision of Rejection dated Jan. 25, 2017, issued in Chinese Patent Application No. 2013800310497 and English translation.
Search Report dated Dec. 11, 2012, issued in European Patent Application No. 12/172,306.
Written Opinion dated Dec. 11, 2012, issued in European Patent Application No. 12172306.8.
Communication pursuant to Article 94(3) CBE dated Feb. 26, 2016, issued in European Patent Application No. 13744830.4.
Notice of Reasons for Rejection dated May 16, 2017, issued in Japanese Patent Application No. 2015-516731 and English translation.
Office Action dated Jun. 13, 2017, issued in Mexican Patent Application No. MX/a/2014/015245.
Search Report dated May 11, 2017, issued in Russian Patent Application No. 2014152788/12(084365).
Inquiry under the Substantive Examination dated May 22, 2017, issued in Russian Patent Application No. 2014152788/12(084365) and English translation.
Anonymous, "Measures," Oct. 31, 2016, 7 pages.
AZoM, "Adhesives—Application and Joint Design," Mar. 16, 2001, https://www.azom.com/article.aspx?ArticleID=190, 4 pages.
Third Party Observation for Application No. EP 20130744830, Oct. 31, 2016, 3 pages.
Examination Report dated Mar. 27, 2019, issued in India Application No. 333/CHENP/2015, 5 pages.
Office Action dated Apr. 18, 2019, issued in Canada Application No. 2,875,647, 4 pages.
Notice of Second Preliminary Rejection (English translation) dated May 20, 2020, issued in Korea Application No. 10-2015-7000895, 9 pages.

* cited by examiner

BUTT-WELDED TUBULAR PACKAGING BODY

This application is the U.S. national phase of International Application No. PCT/IB2013/054816 filed Jun. 12, 2013 which designated the U.S. and claims priority to EP Patent Application No. 12172306.8 filed Jun. 15, 2012, the entire contents of each of which are hereby incorporated by reference.

FIELD OF THE INVENTION

The invention lies in the field of flexible tubes or pouches formed using plastic films. It relates more specifically to the flexible tubes or pouches of which the ends are butt-welded.

PRIOR ART

Many flexible tubes are made by welding the ends of a film containing at least one layer of plastic.

The butt welding of flexible films in order to form tubular packaging bodies is described in patent applications WO 2007/113781 and WO 2007/113782. Butt welding is advantageous in many cases, since this welding configuration makes it possible to improve the esthetics of the packagings owing to a decoration over the entire circumference of the tubular bodies. Butt welding also makes it possible to limit the interactions between the packaged product and the packaging since the possible migrations through the edge of the flexible film are very greatly reduced. By virtue of butt welding, the use of novel multilayer structures becomes possible. The multilayer packagings thus obtained have a greater delamination resistance.

The strength of the packaging at the butt-welded zone is often lower than the strength of the flexible film. This reduction in strength is even more critical with multilayer films that comprise non-butt welding layers. In order to overcome these difficulties, patent applications WO 2007/113781 and WO 2007/113782 propose the addition of a thin reinforcing strip at the butt weld. FIG. 1 illustrates a solution described in application WO 2007/113781. A tubular packaging body 1 is formed from a multilayer flexible film 2 comprising an intermediate layer 4, the butt welding of which is only partial or non-existent. In order to strengthen the butt welding zone 6, patent application WO 2007/113781 describes the use of a thin and very strong reinforcing strip 7. The strip 7 is welded onto the lower layer 5 of the multilayer film and joins the two welded ends of the laminate. As is described in application WO 2007/113781, the packaging thus obtained has great tensile strength, burst strength or tear strength at the zone 6 owing to the properties of the reinforcing strip 7.

Patent application EP 0 177 470 describes the use of a reinforcing strip welded to the inside of the tube and that joins the butt-welded ends of the film. It proposes a wide strip containing a thick aluminum foil that gives the plastic tube deformation behavior similar to that of an aluminum tube (no spring-back). This strip is at least equal to 10% of the circumference of the tube and mainly modifies the behavior of the tube (the rigidity) in the direction of the axis of the packaging. A tube produced according to patent application EP 0 177 470 has the major drawback that the packaged product is in contact with the aluminum layer of the reinforcing strip. The direct aluminum-product contact is generally avoided in the packaging field and mainly for liquid or pasty products packaged in tubes.

Problem to be Resolved

However, after tests and use of the flexible tubes manufactured according to the method described in patents WO 2007/113781, WO 2007/113782 and EP 0 177 470 it is observed that the repetitive deformation of the packaging in order to extract the product may create a fracture of the weld zone 6 and reveal the defect illustrated in FIG. 2. FIG. 2 shows that despite the fracture of the butt weld, the packaging retains its leaktightness owing to the properties of the strip 7. However, the appearance of this defect may make the user believe that the packaging is of poor quality or defective.

Definition of the Terms Used in the Summary of the Invention

In the summary of the invention the following terms and abbreviations are used:

Multilayer film: film comprising several layers. The multilayer film may be obtained by coextrusion and/or complexing.
PET: biaxially-oriented polyethylene terephthalate
BOPP: biaxially-oriented polypropylene
PA: polyamide
PE: polyethylene
LDPE: low-density polyethylene
LLDPE: linear low-density polyethylene
HDPE: high-density polyethylene
EVOH: ethylene-vinyl alcohol
Adhesive: adhesive used to join several layers via complexing

GENERAL SUMMARY OF THE INVENTION

The invention consists in adding to the butt weld a reinforcing element that has the effect of making the weld zone non-deformable perpendicular to the welded ends without substantially modifying the flexibility of the weld zone in the tangential direction to the welded ends.

According to the invention, the reinforcing element added to the butt weld is invisible and imperceptible. It is invisible because it is located on the inside of the packaging. It is imperceptible because its small size does not significantly modify the flexibility of the packaging.

According to the invention, the reinforcing element added to the butt weld is made of plastic.

According to the invention, the weld zone is rendered non-deformable locally and in the direction perpendicular to the welded ends owing to the addition, inside of the packaging, of a reinforcing element which cannot be deformed under the action of the fingers in the direction perpendicular to the axis of the reinforcing element, and can be easily deformed in the direction of the reinforcing element.

Surprisingly, it has been found that a reinforcing element of very small size makes it possible to overcome the problem of brittleness of the weld zone. It has been found that the cross section of the reinforcing element defined by its width l and its height h depends on the thickness e of the packaging film and must comply with the following conditions:
 the height h is greater than or equal to the thickness e of the film,
 the ratio $(l \cdot e)/h^2$ is between 1 and 10.

Outside of these limits, it is found that the effect of the reinforcing element for protecting the weld is insufficient or, conversely, that the flexural rigidity of the reinforcing element along the main axis is too great and substantially modifies the flexibility of the packaging.

The invention consists of a tubular packaging formed from a butt-welded flexible film and comprising, at the weld, an invisible and imperceptible reinforcing element that joins the welded ends and prevents any stressing of the weld zone perpendicular to the welded ends.

More specifically, the invention consists of a tubular packaging body formed from a flexible film having a thickness e, the ends of which are butt-welded and covered by a plastic reinforcing element positioned on the inner surface of said tubular body and having a cross section defined by a width l and a height h, said tubular body being characterized in that all of the following conditions must be met:

h is greater than or equal to e, the ratio $(l \cdot e)/h^2$ is between 1 and 10.

Preferably, the height h of the reinforcing element is at most equal to two times the thickness e of the film.

More preferably, the following conditions must also be met:

h is between 100 μm and 500 μm, e is between 100 μm and 400 μm.

More preferably still, the height h of the reinforcing element is 1.2 times equal to the thickness e of the film.

Preferably, l is between 1 and 3 mm.

The film may be a single-layer or multilayer film.

The invention is particularly advantageous when the multilayer film comprises layers which are not welded together or are only partially welded together such as for example layers of aluminum, EVOH, PA, PET, BOPP, paper, or cellulose-based products.

The invention is particularly advantageous when the layer that forms the outer surface of the packaging is not welded together or is only partially welded together. This is the case for example for multilayer films having, as outer surface, layers of PET, BOPP, paper, PA.

According to a first variant of the invention, the reinforcing element added to the inside of the packaging also substantially improves the impermeability properties of the weld zone such as for example the impermeability to oxygen, to aromas, to steam or else to solvents. Depending on the impermeability properties desired, the reinforcing element may be multilayer and/or contain oxygen absorbers.

The reinforcing element may comprise layers consisting of polyolefins, such as for example PE, PP and/or layers consisting of barrier polymers such as for example EVOH.

The oxygen absorbers may be, for example, organic polymers that operate via oxidation of iron, of ascorbic acid or of a polyamide catalyzed by cobalt; these products are standard on the market. These elements react with oxygen in order to limit the migration of the oxygen molecules to the inside of the packaging.

According to a second variant of the invention, the reinforcing element contains additives that make it possible to combat counterfeiting. These additives of microscopic or nanoscopic size do not modify the mechanical properties of the reinforcing element.

These additives are, for example, metal salts or else derivatives of crosslinked melamine particles or powders of micrometer or nanometer size. These additives, added in a very small amount to the plastic, are generally sold in the form of compounds or masterbatches and may be easily integrated into the process for manufacturing the reinforcing element 7. These products are sold for example by the companies Microtrace, Polysecure or Phoenix Plastics.

The first process for producing the tubular packaging body according to the invention consists in forming the reinforcing element together with the butt weld of the flexible film. In one preferred embodiment, a bead of plastic is extruded and deposited in the melt state on the ends of the flexible film; the thermal energy contained in the bead is used to weld the bead to the flexible film and to at least partially weld the ends of the flexible film to one another; and finally the bead is shaped by a suitable tool in order to form the reinforcing element according to the dimensions defined in the invention.

A second process consists in welding a previously manufactured plastic reinforcing element to the ends of the flexible film. The welding of the reinforcing element to the face of the flexible film that forms the inner wall of the packaging is carried out together with the butt welding of the flexible film. In one preferred embodiment, the bead is preheated before the welding operation.

In one variant of the invention, the process is advantageously coupled with a beveled cutting of the ends of the flexible film in order to facilitate the butt welding. The beveled cutting of the welded ends of the flexible film makes it possible to increase the contact area and the pressurization of the weld zone. According to one preferred embodiment of the invention, a cutting angle of 45° with respect to the surface of the film is used.

BRIEF DESCRIPTION OF THE FIGURES

The invention will be better understood with the aid of the description of embodiments of these and the following figures in which:

FIGS. 3 to 8 show the cross-sectional view of the weld zone of the tubular packaging, the cross section being taken perpendicular to the axis of the tubular body.

FIG. 3 presents a first exemplary embodiment of the invention consisting in using a reinforcing element of semioval cross section characterized by its width and its height in order to reinforce the weld.

FIG. 4 presents the effect of the reinforcing element on the reinforcement of the weld zone and the displacement of stresses outside of the weld zone.

FIGS. 5 to 7 illustrate various cross sections of reinforcing elements that make it possible to reinforce the weld zone according to the invention.

FIG. 8 shows a variant of the invention that also consists in constraining the weld zone in the direction opposite to the stressing of the weld during the use of the packaging.

DETAILED SUMMARY OF THE INVENTION

The invention consists of a novel butt welding configuration for a flexible film that consists in adding to the inside of the packaging a plastic reinforcing element of small size that joins the welded ends of the flexible film; said reinforcing element having the effect of preventing any deformation of the weld zone perpendicular to the welded ends; and said reinforcing element having a geometry such that the flexibility of the weld zone in the direction tangential to the welded ends is not substantially modified.

The reinforcing element has the effect of preventing the modification of the radius of curvature of the packaging at the butt-welded zone.

FIGS. 3 to 8 show the cross-sectional view of the weld zone of the tubular packaging, the cross section being taken perpendicular to the axis of the tubular body.

Figure 3:
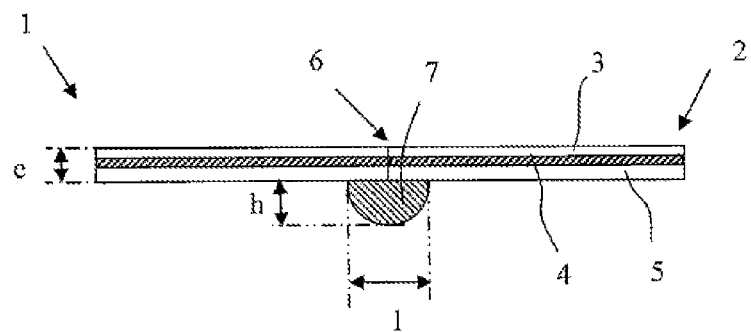
FIGS. 3 to 8 illustrate several embodiments of the invention.

FIG. 3 illustrates a first exemplary embodiment of the invention. The tubular body 1 is formed by butt welding the ends of a flexible film 2 having a thickness e. The weld zone 2 is parallel to the axis of the tubular body. A reinforcing element of semioval cross section 7 joins the ends of the flexible film 2 and reinforces the weld zone 6. The invention is characterized by the fact that the reinforcing element 7 prevents any local deformation of the weld zone 6 perpendicular to the welded ends while modifying the flexibility of the packaging parallel to the welded ends very little. At the weld zone 6, the reinforcing element 7 prevents the variation of the radius of curvature which would have the effect of exerting tensile stress on the welded ends of the flexible film. It has been found that the height h of the reinforcing element depends on the thickness e of the film and must be greater than or equal to the thickness e of the film, that the width l of the reinforcing element must be between 1 mm and 3 mm, and that the ratio $(l \cdot e)/h^2$ is between 1 and 10.

It should be noted that in EP 0 177 470, the ratio $(l \cdot e)/h^2$ is not between 1 and 10. Indeed, generally, the diameter of packaging tubes for example for toothpaste or cosmetics lies between 28 and 50 mm. A calculation of the minimum and maximum ratio for reasonable combinations that can be achieved in EP 0 177 470 is described in detail below:

Theoretical Strip:
The thickness of the aluminum layer is between 40 and 200 μm.
The thickness of the PE layer is between 10 and 50 μm.
The width of the strip corresponds to at least 10% of the circumference of the tube.
The minimum width l of the strip is equal to 8.79 mm, i.e. 8790 μm for a tube diameter of 28 mm.
The maximum width l of the strip is equal to 15.7 mm, i.e. 15 700 μm for a tube diameter of 50 mm.
The minimum height h of the strip is 60 μm (aluminum layer having a minimum thickness of 40 μm between two PE layers having a minimum thickness of 10 μm).
The maximum height h of the strip is 300 μm (aluminum layer having a minimum thickness of 200 μm between two PE layers having a minimum thickness of 50 μm).

Theoretical Film:
The thickness of the aluminum layer is between 5 and 40 μm.
The thickness of the PE layer is between 10 and 50 μm.
The minimum thickness e of the film is 25 μm (aluminum layer having a minimum thickness of 5 μm between two PE layers having a minimum thickness of 10 μm).
The maximum thickness e of the film is 140 μm (aluminum layer having a minimum thickness of 40 μm between two PE layers having a minimum thickness of 50 μm).

The reasonable combinations A and B are the following:
A) Strip having a maximum height h of 300 μm and film having a maximum thickness e of 140 μm,
B) Strip having a minimum height h of 60 μm and film having a minimum thickness e of 25 μm.

Thus, the maximum ratio $(l \cdot e)/h^2$ for combination A is equal to $(15\,700 \times 140)/300^2 = 24.4$ and the minimum ratio $(l \cdot e)/h^2$ for combination B is equal to $(8790 \times 25)/60^2 = 61.0$.

These calculations of the ratio $(l \cdot e)/h^2$ for tubes as described in EP 0 177 470 demonstrate that the ratio $(l \cdot e)/h^2$ is not between 1 and 10.

Figure 4:
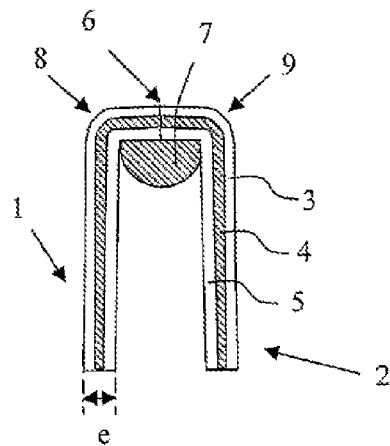

FIG. 4 illustrates the reinforcing effect of the weld zone 6 by the reinforcing element 7. The flexural deformation of the weld zone 6 perpendicular to the welded ends becomes impossible due to the geometry of the reinforcing element 7 which locally provides very great rigidity. In the direction of the weld, the flexibility of the packaging is modified very little since the reinforcing element 7 is stressed in the direction of the length and its cross section is of small size with respect to the cross section of the packaging which is stressed during a deformation. Blind user tests show that the user does not detect the presence of the reinforcing element 7 during the handling of the packaging in order to extract the product therefrom for example.

Figure 1:
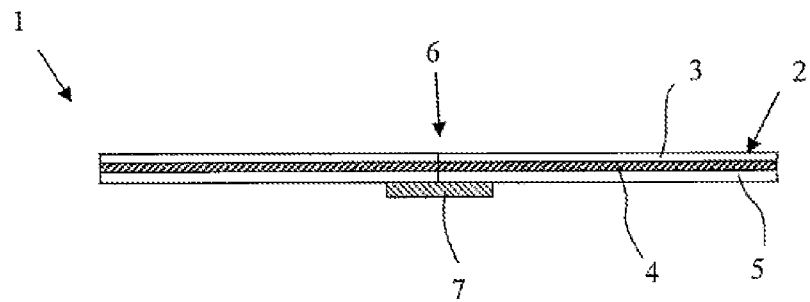
FIG. 1 represents the use of a welding reinforcing element inside a packaging as is described in the prior art.
Figure 2:
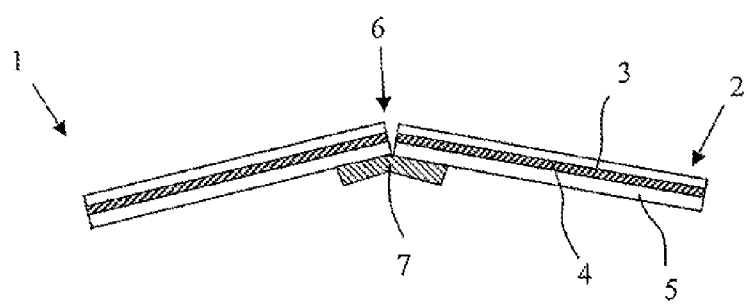
FIG. 2 illustrates the defect observed with the welding reinforcing elements described in the prior art.

As is illustrated in FIG. 3, the invention is particularly advantageous when the film is formed from a multilayer structure. FIG. 3 shows the butt welding of a film comprising three layers; a first layer 3 that forms the outer surface of the packaging, an intermediate layer 4, and a layer 5 that forms the internal surface of the packaging. The reinforcing element 7 is welded to the layer 5 and is consequently inside the packaging. The materials constituting the reinforcing element 7 and the lower layer 5 of the multilayer film are generally of the same nature in order to enable the welding of the reinforcing element 7 to the layer 5. The materials used for the layer 5 and the reinforcing element 7 are, for example, polyolefins commonly used for producing packagings. The intermediate layer 4 is often a barrier layer such as for example an aluminum layer or an EVOH layer or else a metalized PET layer. The optional adhesive layers are not represented in the figures of the patent in order not to complicate the summary of the invention. The layer 3 forming the outer surface of the packaging is often chosen for its ability to be printed, for its tactile properties but also for its strength. The outer layer 3 is for example a "soft touch" layer based on polyolefin or a biaxially-oriented PET layer for its ability to be printed, for its strength, for its transparency, for its gloss. The butt welding of the multilayer film 2 often leads to a partial welding due to the nature of the layers and their thinness. This results in a reduced strength at the weld. The invention makes it possible to prevent any stressing of the weld zone that has the effect of creating the defect illustrated in FIG. 2.

The effect of the reinforcing element 7 on the strength of the weld is illustrated in FIG. 4. During a folding action of the packaging at the weld illustrated in FIG. 4 which would have the effect of separating the ends of the multilayer film the weld zone 6 is free of stress and deformation owing to the action of the reinforcing element 7, the cross section of which is of semioval shape. The geometry and the small size of the reinforcing element 7 has the effect of concentrating the stresses and deformations in the zones 8 and 9 which are away from the weld. Due to its small size and its shape, the cross section of the reinforcing element 7 cannot be deformed under the action of the pressure of the fingers. The cross section of the reinforcing element 7 significantly locally increases the flexural rigidity of the packaging in the direction perpendicular to the welded ends. This increase in the rigidity of the packaging perpendicular to the welded ends takes place locally over a total distance of less than or equal to 3 mm. The order of magnitude of the increase in the flexural rigidity at the weld and perpendicular to the welded ends is a factor of at least 25, or even 100. On the other hand, the reinforcing element 7 has little influence on the rigidity of the packaging in the direction parallel to the welded ends. On the other hand, it is estimated that, due to its small size, the reinforcing element 7 only increases the flexural rigidity of the packaging by a factor of less than or equal to 4. The various tests carried out demonstrate that the user does not detect the presence of the reinforcing element 7 during the use of the packaging. The reinforcing element 7 is invisible since it is located inside the packaging and is imperceptible since the properties of the packaging are only modified very locally.

Figure 5:
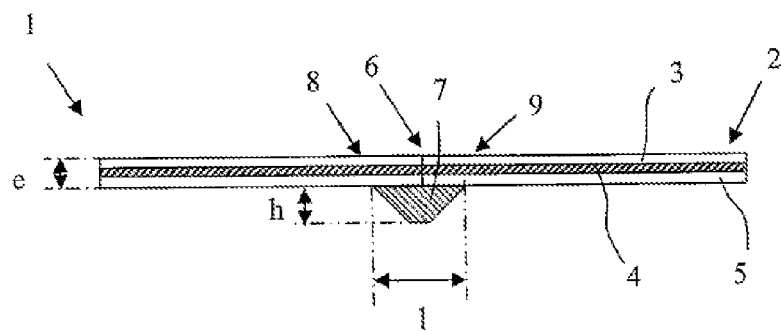
Figure 6:
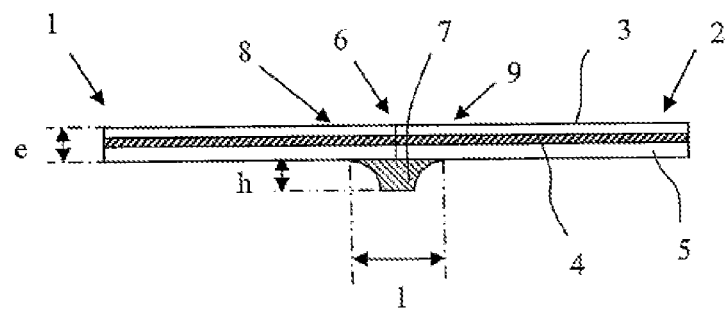
Figure 7:
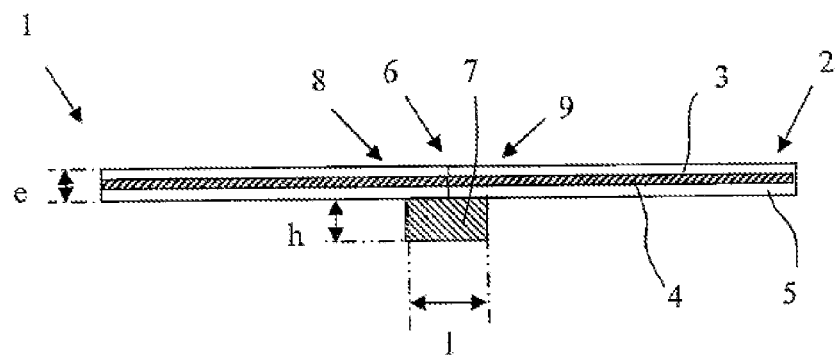

FIGS. 5, 6 and 7 show other advantageous cross sections of the reinforcing element 7. FIG. 5 illustrates a reinforcing element having a cross section of isosceles trapezoid shape, FIG. 6 a reinforcing element having a cross section of isosceles trapezoid shape, the two sides of which are concave and FIG. 7 a reinforcing element having a cross section of rectangular shape. The geometries of the reinforcing element illustrated in FIGS. 5 and 6 make it possible to limit the stress concentration that may appear in the zones 8 and 9 when the multilayer film is bent greatly at the weld. These cross sections of the reinforcing element 7 allow a more gradual transition of the deformation of the multilayer film in the zones 8 and 9 and prevent possible stress concentrations which would have the effect of degrading the multilayer film. FIG. 7 illustrates the cross section of a reinforcing element 7 that is easy to produce but that may create high stress concentrations in zones 8 and 9 during the bending of the film 1 along the weld 6.

Figure 8:
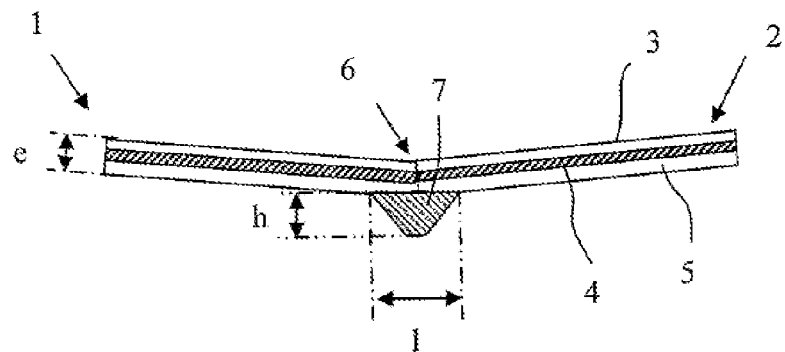

FIG. 8 shows a variant of the invention that consists in pre-stressing the multilayer film by the cross sectional reinforcing element 7 at the weld 6. The pre-stressing has the effect of pressing the ends of the film against one another at the butt weld 6.

The multilayer film illustrated in FIGS. 3 to 8 comprises a layer 3 that forms the upper surface of the laminate; a second layer 5 that forms the lower surface of the laminate and a layer 4 trapped between the layers 3 and 5; said layers 3, 4 and 5 possibly being of a different nature; and said layers 3, 4 and 5 being bonded together at their interface. The multilayer film generally comprises one or more non-butt welding layers. The layer 3 is customarily chosen for its ability to be printed. This layer consists for example of PE or PP, paper, PET or BOPP. This layer may be printed on its outer face forming the surface of the multilayer film or on its inner face that is trapped in the thickness of the multilayer film. The layer 4 that forms a thin layer having barrier properties is not generally welded at its ends. The layer 4 is for example an aluminum foil or a layer of EVOH (ethylene-vinyl alcohol). The layer 5 that forms the inner surface of the tube is welded at its ends. A layer 5 made of polyolefin is advantageous. The reinforcing element 7 is firmly attached to the lower layer 5 by welding. The reinforcing element 7 comprises at least one layer having the same nature as the lower layer 5 of the multilayer film.

It is often advantageous to use the reinforcing element 7 in order to jointly improve the strength of the weld and its impermeability properties. The use of a reinforcing element that is a multilayer reinforcing element and/or that contains oxygen absorbers makes it possible to also improve the impermeability of the weld zone to oxygen for example. The combination of an aluminum layer in the flexible film with a reinforcing element that is a multilayer reinforcing element or that contains oxygen absorbers makes it possible to manufacture packagings having very high impermeability. A multilayer reinforcing element will advantageously comprise a thin layer of EVOH or another barrier polymer.

The reinforcing element 7 is advantageously used for jointly improving the strength of the weld and protection of the packaging against counterfeiting. The reinforcing element 7 may contain additives in the form of nanoparticles such as metal salts or oxides or else multilayer microadditives for which the combinations of layers and colors may give more than 37 million unique codes.

Several processes for making the packaging according to the invention may be envisaged.

A first process consists in extruding a bead of plastic and depositing it in the melt state on the ends of the flexible film. The heat contained in the bead is used to weld the bead to the layer 5 of the flexible film, and to at least partially butt weld the ends of the flexible film. The bead is then shaped using a tool of suitable geometry in order to form the reinforcing element, the cross section of which corresponds to the dimensions defined in the invention. During the extrusion, the geometry of the bead is cylindrical; said cylindrical bead is deposited in the melt state on the ends of the flexible film; a portion of the heat contained in the cylindrical bead is transferred to the flexible film at the ends; said bead is shaped and pressed against the surface of the flexible film in order to form the reinforcing element 7, the cross section of which corresponds to the description given in the invention; the profiled element, and also the weld zone 6, are cooled.

The deposition of the bead in the melt state is carried out by virtue of a relative movement between the extrusion device and the flexible film. Preferably, the extrusion device is fixed and the packaging moves at constant speed with respect to said extrusion device. The shaping operation of the reinforcing element is carried out by pressure of the bead in a shaping tool. In a first example, the shaping tool is fixed with respect to the bead and the flexible film. The bead in the melt state is pressed against the shaping tool that comprises a groove, the cross section of which corresponds to the cross section of the reinforcing element. Preferably, the shaping tool is maintained at a temperature below that of the bead, which has the effect of cooling the reinforcing element at the same time or immediately after its formation. In a second example, the shaping tool moves together with the bead in the melt state in order to prevent friction during the shaping operation of the reinforcing element. The shaping tool may be a wheel comprising a groove on its periphery, the cross section of which corresponds to the cross section of the reinforcing element. The tangential speed of the wheel at the interface with the flexible film is equal to the rate of travel of the flexible film. In one preferred embodiment, the wheel is rotated by the movement of the flexible film.

A second process for producing the weld is based on the extrusion of a bead, the cross section of which is close to the cross section of the reinforcing element, then in shaping the final geometry of the reinforcing element according to the first process.

A third process for producing the weld is based on the use of a previously manufactured reinforcing element 7, then in the joining thereof to the abutted ends of the flexible film 2. One preferred embodiment of the third process consists in welding the reinforcing element 7 to the flexible film 2 at the same time as the operation for butt welding the ends of the flexible film 2.

Here are some examples of the packaging structure and of the geometry of reinforcing elements produced according to the invention:

Description of the Multilayer Film of the First Example:
Layer 3: 12 micron thick PET layer
Layer 4: 12 micron thick metalized PET layer
Layer 5: 140 micron thick PE layer
The thickness e of the flexible film is equal to 0.164 mm
Description of the Reinforcing Element of the First Example:
PE reinforcing element of semioval cross section as illustrated in FIG. 3

The width l is equal to 2 mm
The height h is equal to 0.5 mm
The ratio $(l \cdot e)/h^2$ is equal to 1.312.
Description of the Multilayer Film of the Second Example:
  Layer 3: 100 micron thick paper layer
  Layer 4: 12 micron thick metalized PET layer
  Layer 5: 100 micron thick PE layer
  The thickness e of the flexible film is equal to 0.212 mm
Description of the Reinforcing Element of the Second Example:
  PE reinforcing element of isosceles trapezoid cross section as illustrated in FIG. 5
  The reinforcing element comprises multilayer microadditives in order to prevent counterfeiting of the packaging
  The width l is equal to 2.0 mm
  The height h is equal to 0.4 mm
  The ratio $(l \cdot e)/h^2$ is equal to 2.650.
Description of the Multilayer Film of the Third Example:
  First layer: 20 micron thick BOPP layer
  Second layer: 140 micron thick PE layer
  Third layer: 7 micron thick aluminum layer
  Fourth layer: 100 micron thick PE layer
  The thickness e of the flexible film is equal to 0.267 mm
Description of the Reinforcing Element of the Third Example:
  PE reinforcing element of isosceles trapezoid cross section, the two sides of which are concave, as illustrated in FIG. 6
  The PE reinforcing element contains oxygen absorbers
  The width l is equal to 3 mm
  The height h is equal to 0.4 mm
  The ratio $(l \cdot e)/h^2$ is equal to 5.006.
Description of the Multilayer Film of the Fourth Example:
  Layer 3: 12 micron thick PET layer printed on the lower face
  Layer 4: 12 micron thick PET layer with SiOx coating
  Layer 5: 200 micron thick PE layer
  The thickness e of the flexible film is equal to 0.224 mm
Description of the Reinforcing Element of the Fourth Example:
  PE reinforcing element having a rectangular cross section as illustrated in FIG. 7
  The width l of the reinforcement is equal to 3 mm
  The height h of the reinforcement is equal to 0.27 mm
  The ratio $(l \cdot e)/h^2$ is equal to 9.218.
Description of the Multilayer Film of the Fifth Example:
  Layer 3: 20 micron thick BOPP layer printed on the upper face
  Layer 4: 9 micron thick aluminum layer
  Layer 5: 140 micron thick PE layer
  The thickness e of the flexible film is equal to 0.169 mm
Description of the Reinforcing Element of the fifth Example:
  PE reinforcing element having a rectangular cross section as illustrated in FIG. 7
  The width l of the reinforcement is equal to 1.2 mm
  The height h of the reinforcement is equal to 0.3 mm
  The ratio $(l \cdot e)/h^2$ is equal to 2.253.
Description of the Single-Layer Film of the Sixth Example:
  The thickness e of the flexible film made of PE is equal to 0.380 mm
Description of the Reinforcing Element of the Sixth Example:
  PE reinforcing element having a semioval cross section as illustrated in FIG. 3
  The width l of the reinforcement is equal to 2.2 mm
  The height h of the reinforcement is equal to 0.4 mm
  The ratio $(l \cdot e)/h^2$ is equal to 5.225.
Description of the Multilayer Film of the Seventh Example:
  Layer 3: 280 micron thick PE layer printed on the upper face
  Layer 4: 20 micron thick aluminum layer
  Layer 5: 100 micron thick PE layer
  The thickness e of the flexible film is equal to 0.4 mm
Description of the Reinforcing Element of the Seventh Example:
  PE reinforcing element having a rectangular cross section as illustrated in FIG. 7
  The width l of the reinforcement is equal to 2.4 mm
  The height h of the reinforcement is equal to 0.45 mm
  The ratio $(l \cdot e)/h^2$ is equal to 4.741.

The invention is particularly advantageous since it makes it possible to produce packagings by butt welding films that combine welding layers and layers which are not butt welded. The invention makes it possible to butt join the ends of a film of which the ends are partially welded.

The invention makes it possible to obtain welded packagings with a very high strength at the weld zone. The packagings obtained may be printed over their entire surface without a break in the printing in the weld zone. The invention makes it possible to obtain packagings of great strength and improved esthetics.

The invention is particularly advantageous for producing packaging tubes. The invention also has numerous advantages for the production of flexible packaging pouches.

The description of the invention has been given with flexible films comprising three layers. In this description, the thin adhesive layers that are essential for the cohesion of the multilayer film have been deliberately excluded from the description so as not to complicate the summary of the invention. It is also obvious for a person skilled in the art that the invention is not limited to flexible films comprising one to three layers; the number of layers not being a limiting factor of the invention.

The invention claimed is:

1. A tubular packaging body formed from a flexible film having a thickness e, the ends of which are butt-welded and covered by a plastic reinforcing element, which does not include any metal, positioned on an inner surface of said tubular body and having a cross section defined by a width l and a height h, wherein:
  h is greater than or equal to e,
  the ratio $(l \cdot e)/h^2$ is between 1 and 10; and
  l is greater than 0 and is less than or equal to 3 mm.

2. The tubular body as claimed in claim 1, wherein the height h is at most equal to two times the thickness e.

3. The tubular body as claimed in claim 1, wherein:
  h is between 100 μm and 500 μm,
  e is between 100 μm and 400 μm.

4. The tubular body as claimed in claim 2, wherein the height h is equal to 1.2 times the thickness e.

5. The tubular body as claimed in claim 1, wherein l is between 1 mm and 3 mm.

6. The tubular body as claimed in claim 1, wherein said reinforcing element has a cross section of semioval shape.

7. The tubular body as claimed in claim 1, wherein said reinforcing element has a cross section of isosceles trapezoid shape.

8. The tubular body as claimed in claim 1, wherein said reinforcing element has a cross section of isosceles trapezoid shape, the two sides of which are concave.

9. The tubular body as claimed in claim 1, wherein said reinforcing element has a cross section of rectangular shape.

10. The tubular body as claimed in claim 1, wherein the ends of the film are beveled.

11. The tubular body as claimed in claim 1, wherein said film is a multilayer film and comprises at least one layer for which the butt welding is only partial or non-existent.

12. The tubular body as claimed in claim 11, wherein said layer forms an outer surface of the packaging.

13. The tubular body as claimed in claim 1, wherein said reinforcing element comprises several layers.

14. The tubular body as claimed in claim 1, wherein said reinforcing element comprises microscopic or nanoscopic markers in powder form that make it possible to combat counterfeiting.

15. The tubular body as claimed in claim 1, wherein the ratio of the flexural rigidity at the weld between the direction perpendicular to the weld and the direction parallel to the weld is at least equal to 25.

16. The tubular body as claimed in claim 1, wherein the plastic reinforcing element includes a barrier polymer.

17. The tubular body as claimed in claim 1, wherein the plastic reinforcing element includes an organic polymer that is an oxygen absorber.

\* \* \* \* \*